United States Patent
Nakai et al.

(10) Patent No.: US 7,112,074 B2
(45) Date of Patent: Sep. 26, 2006

(54) MEMORY CARD ADAPTOR

(75) Inventors: Yasuo Nakai, Nara (JP); Akihiro Tanaka, Matsubara (JP)

(73) Assignee: Hosiden Corporation, Yao (JP)

( * ) Notice: Subject to any disclaimer, the term of this patent is extended or adjusted under 35 U.S.C. 154(b) by 0 days.

(21) Appl. No.: 11/331,037

(22) Filed: Jan. 13, 2006

(65) Prior Publication Data

US 2006/0166559 A1    Jul. 27, 2006

(30) Foreign Application Priority Data

Jan. 21, 2005    (JP) .............................. 2005-013494

(51) Int. Cl.
*H01R 13/62* (2006.01)
(52) U.S. Cl. ................... 439/159; 439/630; 439/941
(58) Field of Classification Search ............... 439/630, 439/633, 676, 159, 941, 946, 153
See application file for complete search history.

(56) References Cited

U.S. PATENT DOCUMENTS

| | | | |
|---|---|---|---|
| 6,315,587 B1 * | 11/2001 | Ikemoto et al. ............. | 439/159 |
| 6,464,529 B1 * | 10/2002 | Jensen et al. ................ | 439/405 |
| 6,786,775 B1 * | 9/2004 | Hanrahan et al. ........... | 439/676 |
| 6,935,870 B1 * | 8/2005 | Kato et al. ................... | 439/108 |
| 6,964,587 B1 * | 11/2005 | Colantuono et al. ........ | 439/676 |
| 2004/0014342 A1 * | 1/2004 | Yu et al. ...................... | 439/159 |
| 2006/0014434 A1 * | 1/2006 | Yamamoto et al. ......... | 439/630 |

FOREIGN PATENT DOCUMENTS

| | | |
|---|---|---|
| JP | 2004-272704 | 9/2004 |
| WO | WO 2004/081858 A1 | 9/2004 |

\* cited by examiner

*Primary Examiner*—Michael C. Zarroli
(74) *Attorney, Agent, or Firm*—Bacon & Thomas (57) ABSTRACT

The invention provides a memory card adaptor in which the number of parts is reduced and the cost reduction can be attained. The adaptor has: an adaptor body 4 into and from which a small memory card is to be inserted and extracted through a card insertion port 11 that is opened in a side face, and which is to be inserted into and extracted from a card connector for a large memory card; and plural conductive members 6a to 6i which are arranged in the adaptor body 4, and through which plural connect terminals 303a to 303h of the small memory card are to be electrically connected to plural contacts of the card connector. A linking portion 41 which directly couples plural specific ones 6c, 6f of the plural conductive members 6a to 6i is disposed. The specific conductive members are not adjacent to each other, and the tip ends are positionally shifted from each other in the length direction. A linkage part 41c of the linking portion is between bent portions 41a, 41b which are formed by bending tip end portions of the specific conductive members into "U-like shape" along the length direction, and is formed into a corrugated shape which undulates in card insertion/extraction directions.

4 Claims, 10 Drawing Sheets

MEMORY CARD ADAPTOR

BACKGROUND OF THE INVENTION

1. Filed of the Invention

The present invention relates to a memory card adaptor which is used for connecting a small memory card to a card connector for a large memory card that is larger than the small memory card.

2. Description of the Prior Art

Conventionally, in accordance with advances in miniaturization of small portable apparatuses such as a mobile telephone, a digital still camera, a digital video camera, and a PDA among electronic apparatuses which use a memory card, also the size of a memory card is being reduced.

In the case where the size of a memory card is reduced, in order to connect the miniaturized small memory card to a card connector for an unminiaturized large memory card, a memory card adaptor is required which is connected to the card connector for a large memory card while holding the small memory card, to attain electrical connection between the small memory card and the card connector.

As such a memory card adaptor, an adaptor to which a mini SD (memory) card is to be attached, and which is to be connected to a card connector for a SD (memory) card that is slightly larger than the mini SD card is conventionally provided.

An example of a conventional adaptor for a mini SD card is disclosed in Japanese Patent Application Laying-Open No. 2004-272704. In the disclosed adaptor, the following technique is employed. The adaptor comprises: a box-like adaptor body into and from which a mini SD card is to be inserted and extracted through a card insertion port opened in a side face; and nine contacts (contacts respectively corresponding to pin Nos. 1 to 9 of an SD card) which are arranged in the adaptor body, which are to be electrically connected to plural contacts of a mini SD card that is inserted through the card insertion port, and which, when attached to a socket (card connector), are to be electrically connected to nine contacts of the socket. The adaptor body is configured by coupling together a resin-made base, a cover which covers the base, and a metal shell which is attached to an opening portion of the cover, whereby two contacts of the adaptor (two contacts of 3rd and 6th pins) which are to be connected to a ground contact of the socket through the metal shell.

SUMMARY OF THE INVENTION

Problems to be solved by the invention are as follows. First, among the upper and lower cases (the cover and the base) constituting the adaptor body, the upper case (cover) is split into two parts respectively made of a metal and a resin, the electrical connection to the plural specific conductive members (the two contacts of the 3rd and 6th pin) of the adaptor which are to be connected to the ground contact of the card connector (socket) is made with using the metal part, and therefore the number of parts is increased to raise the production cost. Second, a memory card (hereinafter, referred to as "TF card") which is miniaturized further than a mini SD card, and called "TransFlash (registered trademark)" has been recently developed, but an existing adaptor for a mini SD card cannot cope with a TF card.

It is a first object of the invention to provide a memory card adaptor in which the number of parts is reduced and the cost reduction can be attained. It is a second object of the invention to provide a memory card adaptor for using a TF card while being connected to a card connector for an SD card (used not only as an internal memory incorporated in an electronic apparatus such as a mobile telephone, but also as a removable external memory).

In order to achieve the objects, the invention set forth in claim 1 is a memory card adaptor to which a small memory card is to be attached, and which is to electrically and mechanically connect the small memory card to a card connector for a large memory card which is larger in external shape than the small memory card, wherein the memory card adaptor comprises: an adaptor body into and from which the small memory card is to be inserted and extracted through a card insertion port that is opened in a side face, which is provided with an external shape that is substantially identical with the large memory card, and which is to be inserted into and extracted from the card connector for the large memory card; and plural conductive members which are arranged in the adaptor body, which are to be electrically connected to plural connect terminals of the small memory card that is inserted through the card insertion port, and which, when attached to the card connector, are to be electrically connected to plural contacts of the card connector, a linking portion which directly couples plural specific ones of the plural conductive members is disposed, the specific conductive members being not adjacent to each other, tip ends of the specific conductive members being positionally shifted from each other in a length direction, and a linkage part of the linking portion is between bent portions which are formed by bending tip end portions of the specific conductive members into "U-like shape" along the length direction, and is formed into a corrugated shape which undulates in card insertion/extraction directions.

The invention set forth in claim 2 is a memory card adaptor wherein, in the invention set forth in claim 1, the adaptor body is configured by upper and lower cases which are fitted to each other, and the upper and lower cases are provided respectively with positioning ribs which are fitted to each other.

The invention set forth in claim 3 is a memory card adaptor wherein, in the invention set forth in claim 1, the adaptor body is configured by upper and lower cases which are fitted to each other, a card insertion slot portion for the small memory card is formed by fitting of the upper and lower cases, and the upper and lower cases are provided respectively with fitting portions which are in a periphery of the card insertion slot portion, and which are fitted to each other.

The invention set forth in claim 4 is a memory card adaptor wherein, in the invention set forth in claim 1, the small memory card is a TF card, the large memory card is an SD card, and the specific conductive members are two conductive members which are to be connected to ground contacts of the card connector.

In the invention set forth in claim 1, the linking portion is disposed which directly couples plural specific ones of the plural conductive members, the specific conductive members are not adjacent to each other, and the tip ends of the specific conductive members are positionally shifted from each other in the length direction. Unlike the conventional art, therefore, the configuration is not required where, among the upper and lower cases constituting the adaptor body, the upper case is split into two parts respectively made of a metal and a resin, and the electrical connection to the plural specific conductive members of the adaptor which are to be connected to the ground contact of the card connector is made with using the metal part. Therefore, it is possible to provide a memory card adaptor in which the number of parts is reduced and the cost reduction can be attained.

Furthermore, when "U-like" bending is made, a corrugated shape can be configured in the card insertion direction instead of the card thickness direction, and various corru gated shapes can be set without substantially receiving dimensional restrictions in the card thickness direction. Therefore, an optimum corrugated shape can be easily obtained.

In the invention set forth in claim 2, the fitting portions disposed in the upper and lower cases are fitted to each other, so that the fitting portions provisionally fix the upper and lower cases. Therefore, the adaptor can be easily assembled. In the case where the upper and lower cases are welded by means of heat, an ultrasonic wave, or the like, positional deviation due to the welding does not occur because the upper and lower cases are positioned by the plural fitting portions.

In the invention set forth in claim 3, while the card insertion port and the card insertion slot portion are formed with being split in two parts by the upper and lower cases, plural fitting portions are disposed in the periphery of the card insertion port and the card insertion slot portion. Therefore, the card insertion port and the card insertion slot portion are reinforced by the fitting portions, and the shapes and dimensions of the card insertion port and the card insertion slot portion can be maintained accurately and stably.

In the invention set forth in claim 4, it is possible to provide a memory card adaptor which is used for connecting a TF card to a card connector for an SD card (which is used not only as an internal memory incorporated in an electronic apparatus such as a mobile telephone, but also as a removable external memory).

DETAILED DESCRIPTION OF THE PREFERRED EMBODIMENT

Hereinafter, an SD card, a mini SD card, and a TF card which are memory cards will be described, and thereafter an embodiment of the memory card adaptor of the invention will be described with reference to FIGS. 1 to 7.

Figure 10A:
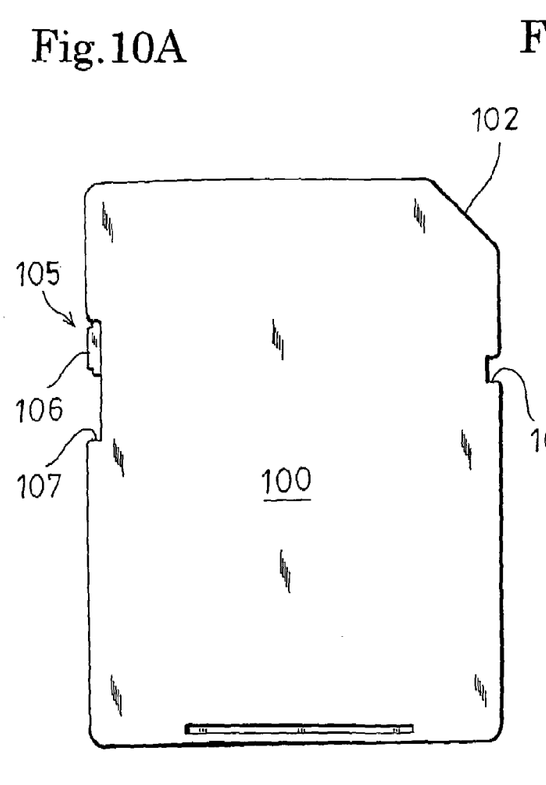
FIG. 10A is a front view of an SD card.
Figures 10B, 10C:
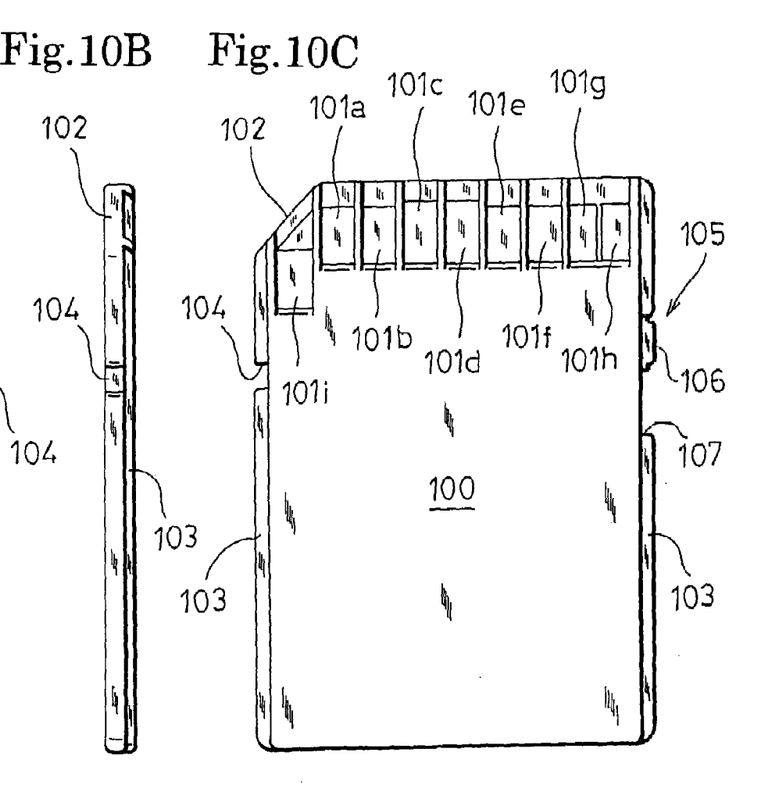
FIG. 10B is a side view of the SD card.
FIG. 10C is a rear view of the SD card.

As shown in FIG. 10, an SD card 100 has a rectangular flat plate-like external shape, and is formed into a size of 24×32×2.1 mm (length×width×thickness). In an end portion rear face of the front side in the case where the SD card 100 is inserted in a normal insertion posture (hereinafter, the side is referred to as "rear side"), nine connect terminals 101a to 101i are juxtaposed in a direction (hereinafter, referred to as "lateral direction") perpendicular to the longitudinal direction and the thickness direction. In the rear side of the SD card 100, a cut-away portion 102 is formed by cutting away one edge, and, in each of the right and left side portions of the rear face of the SD card 100, a step portion 103 is formed so that the width of the surface of the SD card 100 is larger than that of the rear face. According to the configuration, erroneous insertion of the SD card 100 other than insertion in the normal insertion posture into a card connector (equipped in various electronic apparatuses such as a mobile telephone, a digital still camera, a digital video camera, and a PDA) to which the SD card 100 is extractably connected, and which is not shown is blocked by the cut-away portion 102 and the step portions 103. In the one side portion of the SD card 100 in which the cut-away portion 102 is formed, a locking cut-away 104 is disposed in the front side of the cut-away portion 102, and, when the SD card 100 is connected to the card connector, a lock piece of the card connector is engaged with the locking cut-away 104, thereby preventing the SD card 100 from dropping off. In the side portion opposite to the side where the cut-away portion 102 of the SD card 100 is formed, a recess 107 from which a knob 106 of a write-protect switch 105 is exposed is disposed, so that the movement position of the knob 106 in the recess 107 indicates whether the write protect state is set or not. In the nine connect terminals 101a to 101i of the SD card 100, as seen from the side of the rear face, the connect terminal 101i of the 9th pin is placed in the left end on the side of the cut-away portion 102, and the connect terminals 101a to 101h of the 1st to 8th pins are sequentially placed on the right side of the connect terminal 101i which is the 9th pin. The two connect terminals 101c, 101f which are the 3rd and 6th pins (the 4th and 7th pins from the left side as seen from the side of the rear face) are to be connected to two ground contacts of the card connector so as to be grounded.

Figures 9A, 9B:
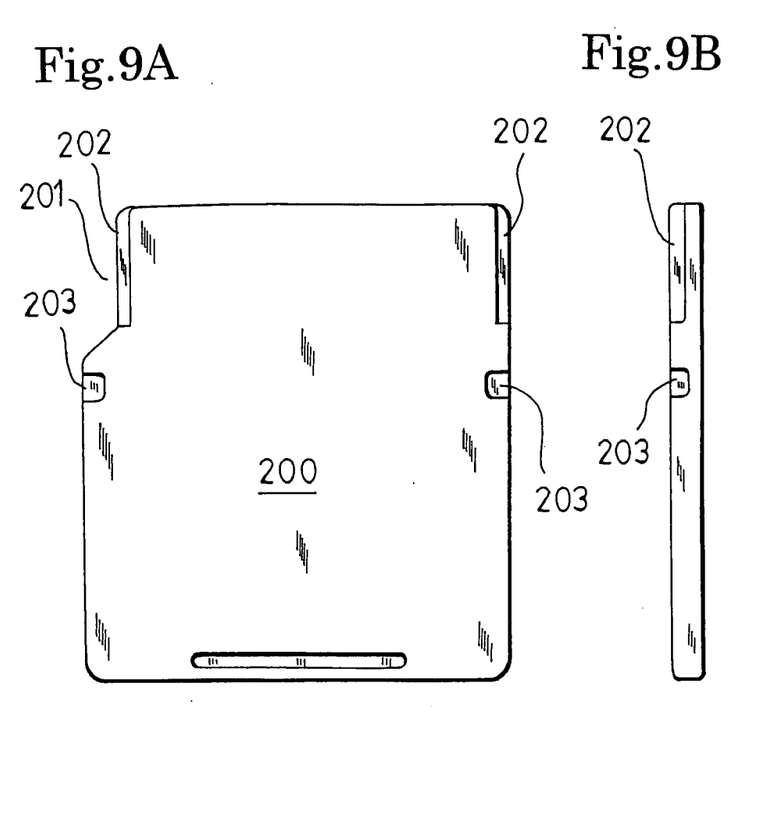
FIG. 9A is a front view of a mini SD card.
FIG. 9B is a side view of the mini SD card.
Figure 9C:
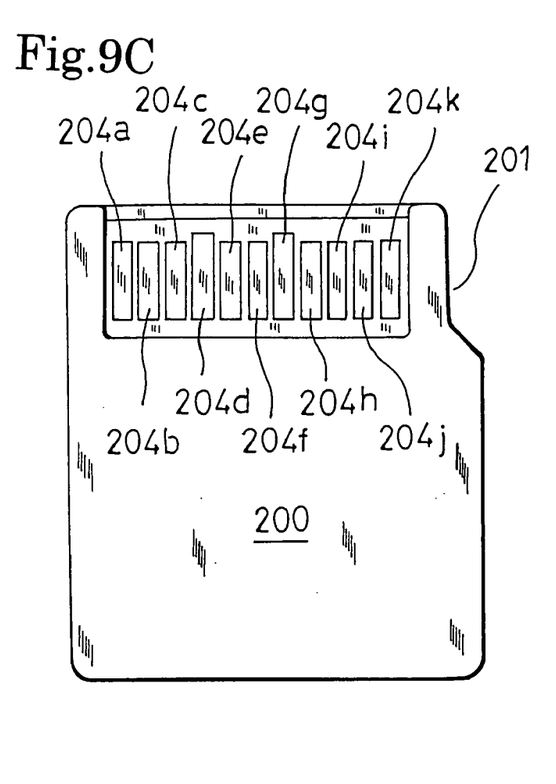
FIG. 9C is a rear view of the mini SD card.

As shown in FIG. 9, a mini SD card 200 has a flat plate-like external shape which is substantially rectangular, and is formed into a size of 20×21.5×1.4 mm (length× width×thickness) which is slightly smaller than the SD card 100. A cut-away portion 201 is formed in one edge of the front side in the case where the mini SD card 200 is inserted in a normal insertion posture (hereinafter, the side is referred to as "rear side"). In each of the right and left side portions of the surface in the rear side of the cut-away portion 201 of the mini SD card 200, a step portion 202 is disposed so that the width of the surface of the mini SD card 200 is smaller than that of the rear face. A locking cut-away 203 is disposed in each of the right and left side portions of the surface of the mini SD card 200 which are in front of the cut-away portion 201. In the rear face of the rear side end portion of the mini SD card 200, connect terminals 204a to 204k of the mini SD card 200 are juxtaposed in a direction (hereinafter, referred to as "lateral direction") perpendicular to the longitudinal direction and the thickness direction. In the connect terminals, two reserve terminals are added, and the number is increased to eleven from nine in the case of the SD card 100. The eleven connect terminals 204a to 204k of the 1st to 11th pins of the mini SD card 200 are sequentially placed from the left side to the right side as seen from the side of the rear face. The two connect terminals 204d, 204i of the 4th and 9th pins of the mini SD card 200 corresponding to the two connect terminals 101c, 101f of the 3rd and 6th pins of the SD card 100 are to be connected to ground contacts of the card connector so as to be grounded. The two connect terminals 204e, 204f of the 5th and 6th pins which are placed in adjacent to the connect terminal 204d of the 4th pin are the reserve terminals.

Figure 2:
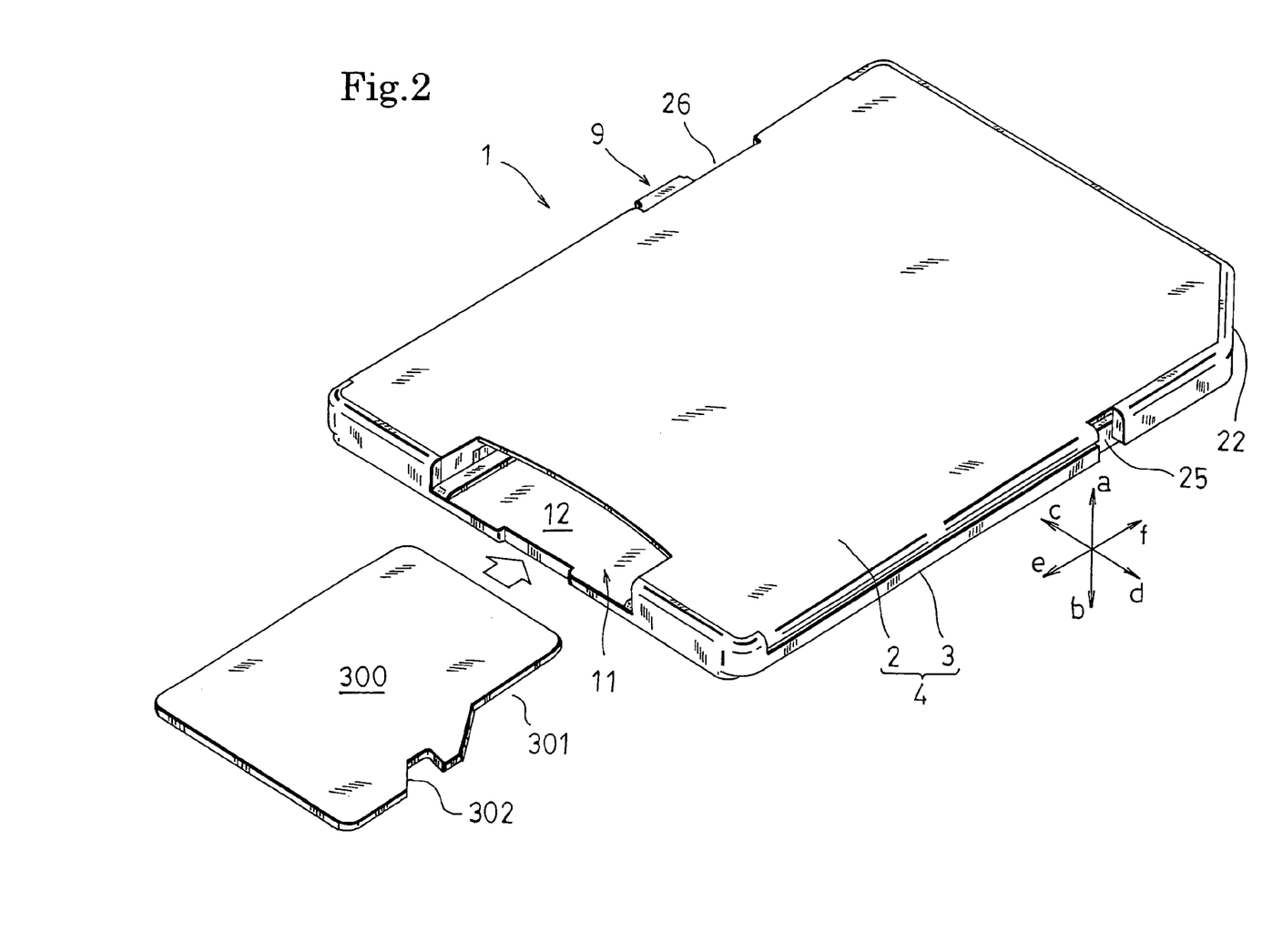
FIG. 2 is an external perspective view of the adaptor and a TransFlash card.
Figure 8A:
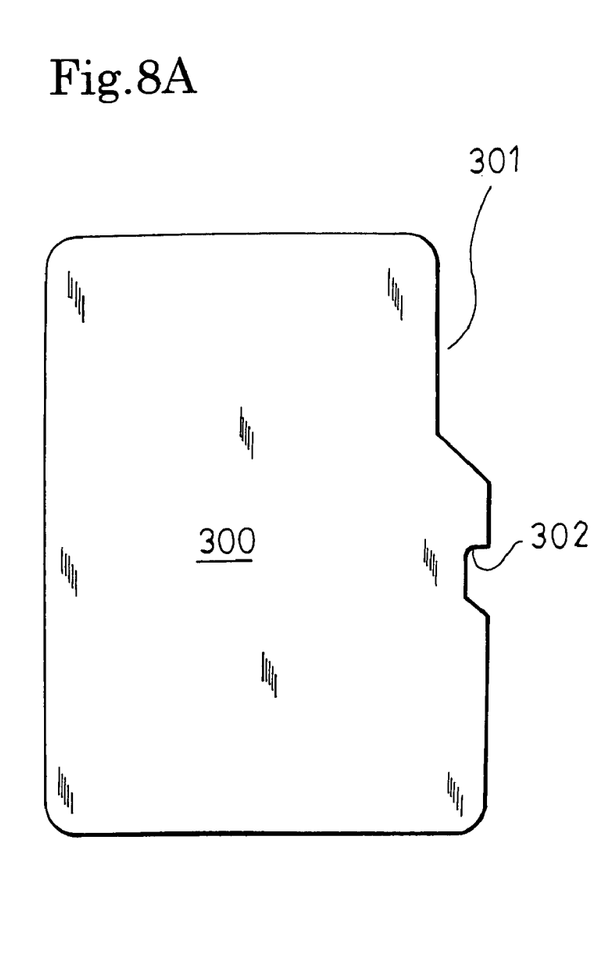
FIG. 8A is a front view of a TransFlash card.
Figure 8B:
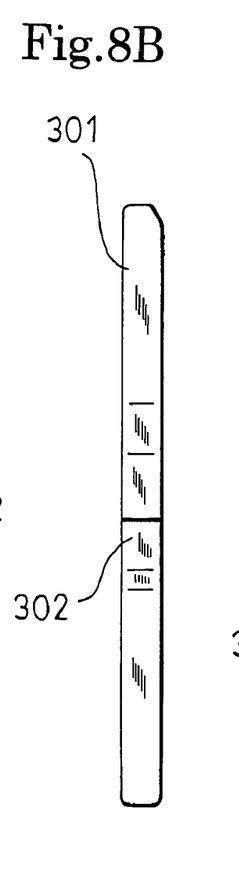
FIG. 8B is a side view of the TransFlash card.
Figure 8C:
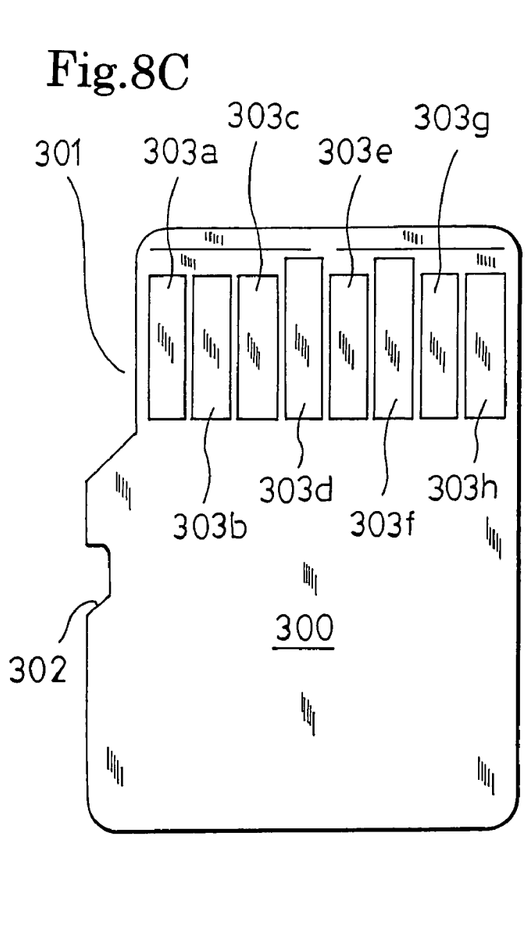
FIG. 8C is a rear view of the TransFlash card.

As shown in FIGS. 8 and 2, a TF card 300 has a flat plate-like external shape which is substantially rectangular, and is formed into a size of 11×15×1 mm (length×width× thickness) which is reduced to one half in size and to one fourth in volume as compared to the mini SD card 200. A cut-away portion 301 is formed in one edge of the front side in the case where the TF card 300 is inserted in a normal insertion posture (hereinafter, the side is referred to as "rear side"). In the one side portion of the TF card 300 in which the cut-away portion 301 is formed, a locking cut-away 302 is disposed in the front side of the cut-away portion 301. In the rear face of the rear side end portion of the TF card 300, connect terminals 303a to 303h of the TF card 300 are juxtaposed in a direction (hereinafter, referred to as "lateral direction") perpendicular to the longitudinal direction and the thickness direction. In the connect terminals, the ground connect terminal is reduced to one, and the number is reduced to eight from nine in the case of the SD card 100. The eight connect terminals 303a to 303h of the 1st to 8th pins of the TF card 300 are sequentially placed from the left side to the right side as seen from the rear face thereof. The one connect terminal 303f of the 6th pin corresponding to the one connect terminal 101f of the 6th pin of the SD card 100 is to be connected to one ground contact of the card connector so as to be grounded.

As described above, the miniaturization of the SD card 100 is currently advanced to the TF card 300 via the mini SD card 200.

A memory card adaptor 1 of the embodiment will be described. The following description is made on the assumption that, unless otherwise specified, the directions of the arrows a–b in FIG. 2 are denoted as the vertical direction (thickness direction), the directions of the arrows c–d as the lateral direction, and the directions of the arrows e–f as the longitudinal direction (insertion/extraction directions).

Figure 1:
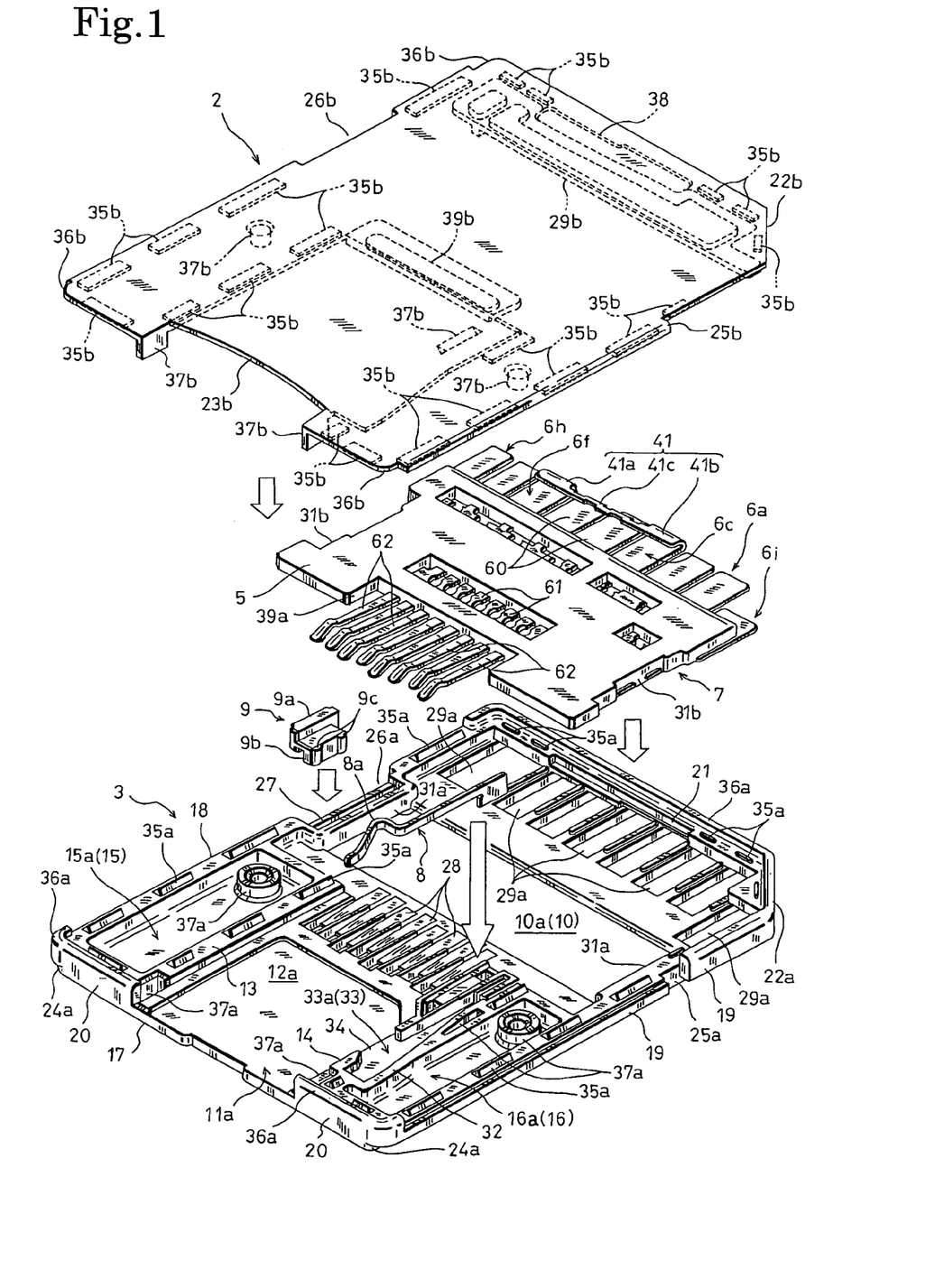
FIG. 1 is an exploded perspective view of a memory card adaptor of an embodiment.
Figure 3:
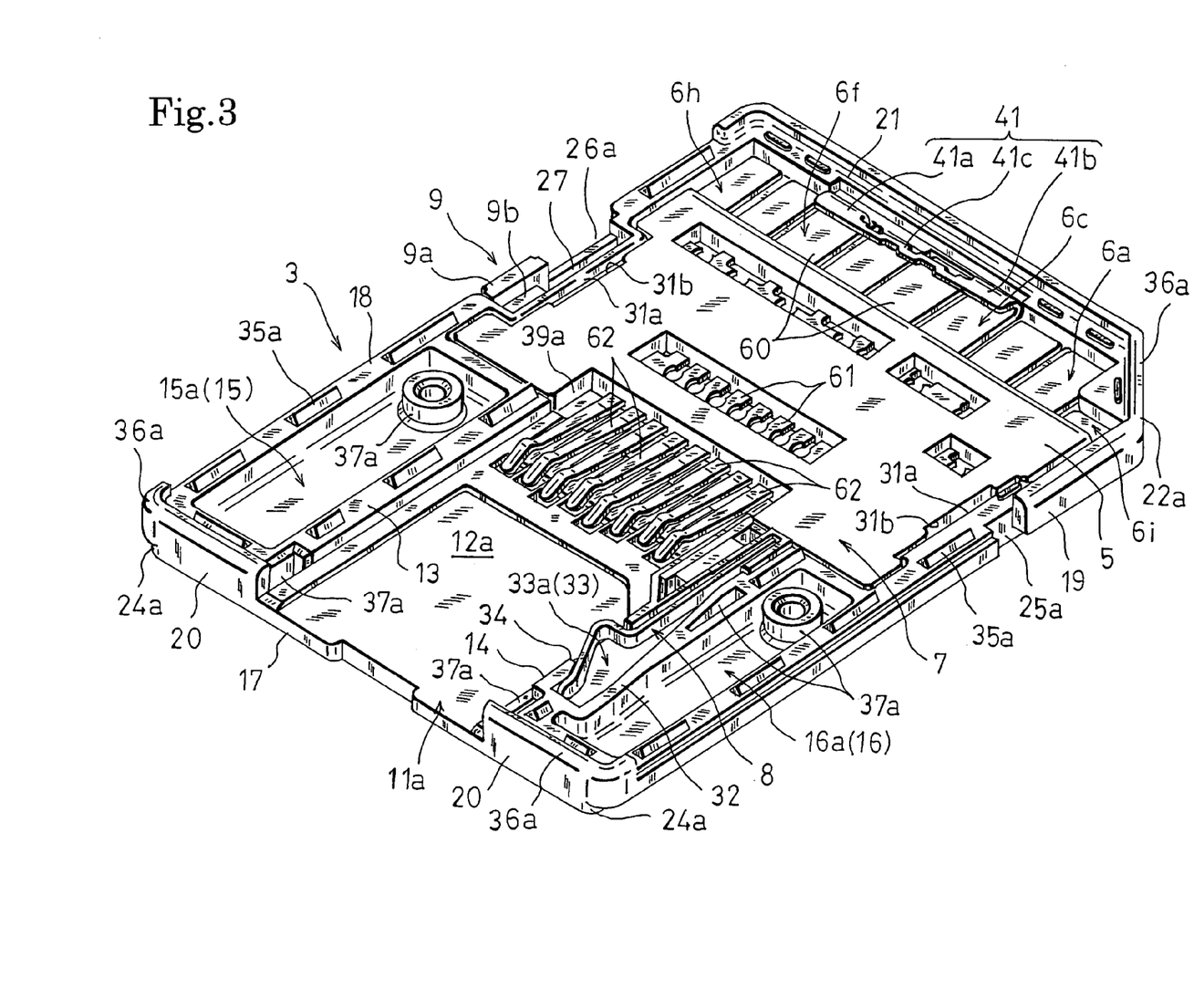
FIG. 3 is an external perspective view of a state where an upper case of the adaptor is removed away.

As shown in FIGS. 1 to 3, the memory card adaptor 1 of the embodiment is a memory card adaptor to which the TF card 300 that is the small memory card shown in FIGS. 8 and 2 is to be attached, and which is used for electrically and mechanically connecting the TF card 300 to a card connector (not shown) for the SD card 100 that is the large memory card shown in FIG. 10. The memory card adaptor is configured by: an adaptor body 4 configured by a cover 2, and a base 3 to which the cover 2 is fitted in the upper face, the cover and the base being respectively upper and lower cases which are fitted to each other; one contact group 7 configured by an rectangular flat plate-like insulator 5, and nine contacts 6a to 6i (the same number as the nine connect terminals 101a to 101i of the SD card 100) which are plural conductive members integrated with the insulator 5; a locking spring 8; and a knob 9 for write protect. The adaptor body 4 configured by the cover 2 and a base 3 is provided with the same external shape as the SD card 100, and formed into the same size (the length, the width, and the thickness). In the rear half of the interior of the adaptor body, a contact housing space 10 is formed over the whole width, and a card insertion slot portion 12 which is a card insertion space is formed in a middle area of the front half. The card insertion slot portion has a section shape (the width and the height) which is substantially identical with the section shape (the width and the thickness) of the TF card 300, and a depth which is substantially equal to the length of the TF card 300. The rear end of the card insertion slot portion communicates with the middle portion of the front end of the contact housing space 10, and the front end communicates with the outside of the adaptor body 4 through a card insertion port 11 which is opened in the middle portion of the front side face of the adaptor body 4, and which has an external shape (the width and the height) that is substantially identical with the section shape (the width and the thickness) of the TF card 300. The TF card 300 can be inserted into and extracted from the space via the card insertion port 11. In the right and left side portions in the front half across the card insertion slot portion 12, formed are right and left extra spaces 15, 16 which are partitioned via the card insertion slot portion 12, the contact housing space 10, and right and left internal partition walls 13, 14.

Figure 5:
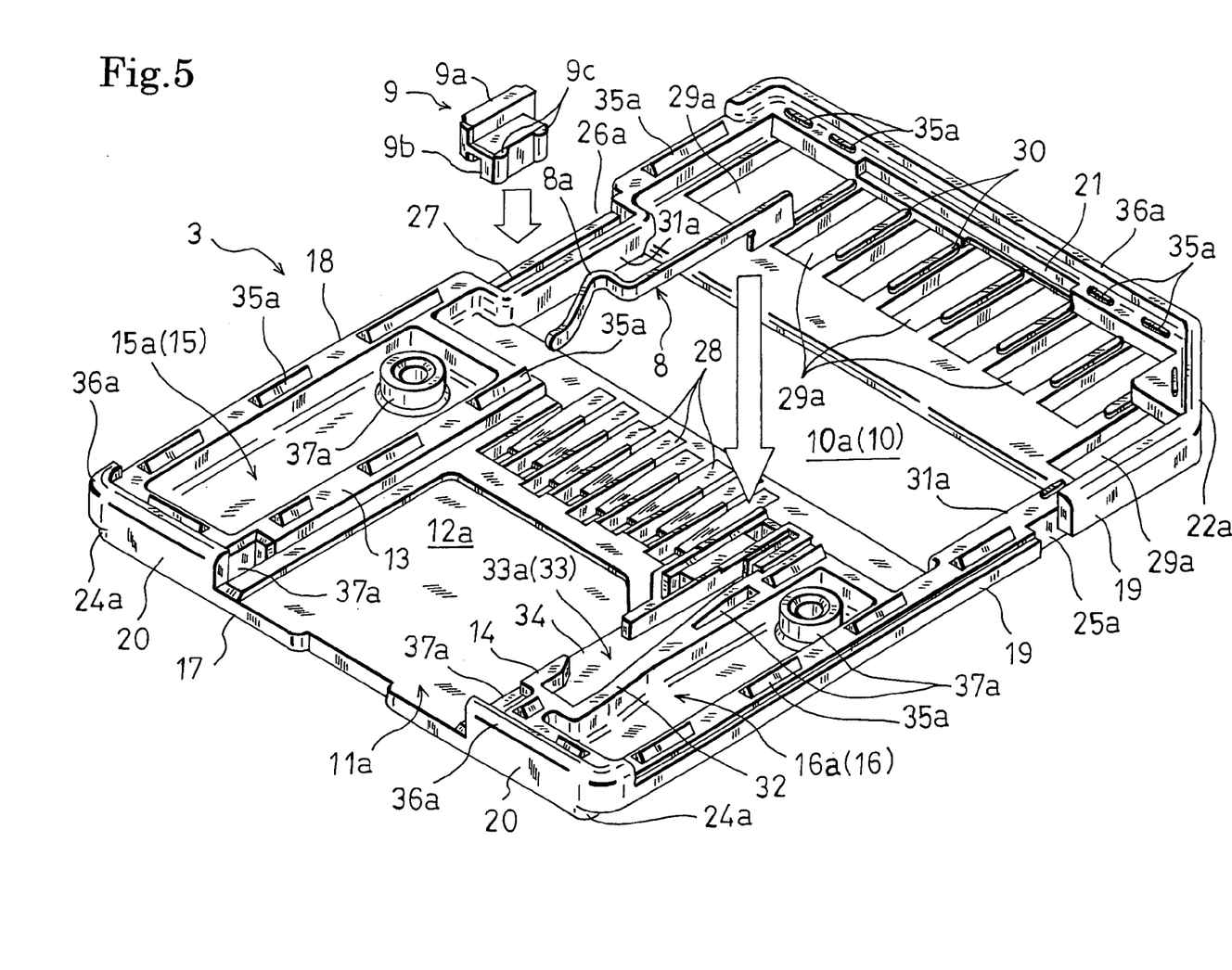
FIG. 5 is an external perspective view of a lower case.

As shown also in FIG. 5, the base 3 is a shallow tray-like synthetic resin molded product which is rectangular in a plan view. On the side of the base 3, a contact housing space 10a in which the upper face is opened, a card insertion port 11a in which the upper edge is opened, a card insertion slot portion 12a in which the upper face is opened, and right and left extra spaces 15a, 16a in which the upper face is opened are formed by: a bottom plate 17; right and left side walls 18, 19 which upstand from an outer peripheral side edge of the bottom plate 17; front and rear side walls 20, 21 which are interrupted in a middle portion corresponding to the card insertion port 11; and the right and left internal partition walls 13, 14 bend in an L-like shape in which one side extends perpendicularly from one of interrupted portions of the front side wall 20 toward the rear side, the other side extends perpendicularly from a rear end portion of the one side toward the outer side, and the tip end of the other side is perpendicularly connected to a longitudinal middle portion of the right or left side wall 18 or 19.

In the base 3, a cut-away portion 22a is formed by cutting away one rear edge. In each of the right and left side portions of the rear face (the face opposite to the face opposed to the cover 2) of the base 3, a step portion 24a which causes the width of the surface of the adaptor 1 to be larger than that of the rear face is formed. In the one side portion in which the cut-away portion 22a of the base 3 is formed, a locking cut-away 25a is disposed in the front side of the cut-away portion 22a. In the side portion opposite to the side where the cut-away portion 22a is formed, a recess 26a from which the knob 9 is exposed is disposed. A groove 27 which extends in the longitudinal direction is formed in an inner area of the recess 26a. An engaging projection which is not shown is upward projected from a middle portion in the longitudinal direction of the groove 27.

In the bottom face of the rear area of the card insertion slot portion 12a of the base 3 in which the upper face is opened, eight narrow-width grooves 28 which extend in the insertion/extraction directions (the longitudinal direction) are formed in juxtaposition in the lateral direction. In the bottom face of the rear area of the contact housing space 10a of the base 3 in which the upper face is opened, eight rectangular through holes 29a which penetrate through the base 3 are formed in juxtaposition in the lateral direction. The through hole 29a which is in the right end as seen from the side of the rear face, or which is on the side opposite to the side where the cut-away portion 22a is formed has a size which is substantially equivalent to the total size of two of the seven through holes 29a that are arranged on the right side of the through hole. The arrangement of the eight through holes 29a which correspond to nine through holes is identical with that of the nine connect terminals 101a to 101i of the SD card 100. Narrow-width ridges 30 which extend in the longitudinal direction protrude between the through holes 29a, respectively. In each of the right and left side portions of the contact housing space 10a of the base 3 in which the upper face is opened, an engagement portion 31a with respect to the insulator 5 of the contact group 7 protrudes toward the inner side.

An approximately A-like partition wall 32 which elongates in the longitudinal direction in a plan view is disposed in the one extra space 16a of the base 3 which, when the TF card 300 is inserted in the normal insertion posture into the card insertion slot portion 12, is on the side where the locking cut-away 302 of the TF card 300 is formed, and in which the upper face is opened. A locking-spring housing space 33a in which the upper face is opened is formed on one side of the card insertion slot portion 12a in which the upper face is opened, across the internal partition wall 14. In the spring housing space 33a, the lateral width is increased as advancing from the rear portion to the front portion. The wide front portion of the spring housing space 33a in which the upper face is opened communicates with the card insertion slot portion 12a in which the upper face is opened, through a communication hole 34 which is formed by breaking a front portion of the internal partition wall 14.

A plurality of projections 35a for fixing with the cover 2 are upward projected from joint portions with respect to the cover 2 in outer peripheral side portions of the base 3 and the card insertion slot portion 12a in which the upper face is opened, i.e., the upper faces of the side walls 18, 19, 20, 21 and the internal partition walls 13, 14, 32. Edge portions 36a which have a height corresponding to the thickness of the cover 2, and which are fitted to the outer side of the cover 2 protrude upward in the joint portions with respect to the cover 2 in the outer peripheral side portions of the base 3, at least in the joint portions with respect to the cover 2 in the four edges (including the cut-away portion 22a) of the base 3. In the embodiment, two edge portions 36a which continuously extend from the outer edge portion of the upper face of the front side wall 20 toward front end portions of the outer edge portions of the upper faces of the right and left side walls 18, 19, and one edge portion 36a which continuously extends from the outer edge portion of the upper face of the rear side wall 21 toward rear end portions of the outer edge portions of the upper faces of the right and left side walls 18, 19 are shown in the figure.

In the base 3, a plurality of fitting portions 37a which serve also as positioning ribs and guides in assembling are formed in the periphery of the card insertion slot portion 12a of the base 3 in which the upper face is opened. In the embodiment, rectangular fitting portions 37a that are formed by outward recessing front end portions of right and left side faces of the card insertion slot portion 12a in which the upper face is opened, cylindrical fitting portions 37a that upward protrude respectively from rear bottom faces of the right and left extra spaces 15a, 16a in which the upper face is opened, and that are formed in right and left outer sides of the card insertion slot portion 12a in which the upper face is opened, and a substantially triangular fitting portion 37a which is in the approximately A-like partition wall 32 that elongates in the longitudinal direction in a plan view, and in which the upper face is opened are shown in the figure.

Figure 4:
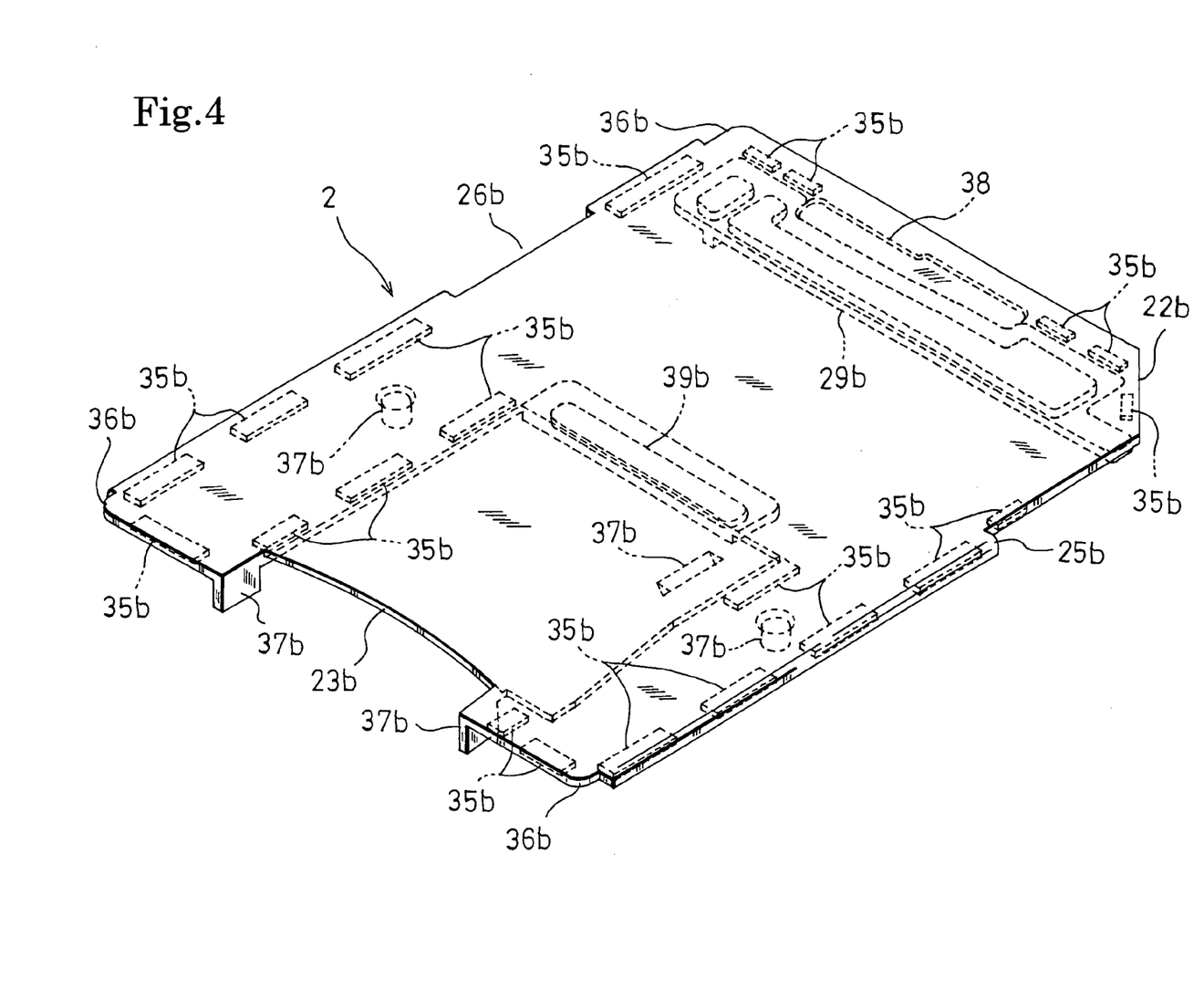
FIG. 4 is an external perspective view of the upper case.

As shown also in FIG. 4, the cover 2 is a plate-like synthetic resin molded product having a shape which is rectangular in a plan view, and which is substantially identical with that of the base 3. When the cover fittingly covers the open upper face of the base 3, the adaptor body 4 is configured where the open upper faces and upper edges of: the contact housing space 10a which is formed on the side of the base 3, and in which the upper face is opened; the card insertion port 11a in which the upper edge is opened; the card insertion slot portion 12a in which the upper face is opened; the right and left extra spaces 15a, 16a in which the upper face is opened; and the locking-spring housing space 33a in which the upper face is opened are integrally closed. The adaptor body is provided with the same external shape as the SD card 100, and the same size (the length, the width, and the thickness). In the adaptor body, the contact housing space 10, the card insertion slot portion 12, the right and left extra spaces 15, 16, and a locking-spring housing space 33 are formed. The card insertion port 11 is formed in the middle portion of the front side face, so that the TF card 300 can be inserted into and extracted from the card insertion slot portion 12 through the card insertion port 11.

In the cover 2, the edge corresponding to the cut-away portion 22a of the base 3 is cut away to form a cut-away portion 22b for cooperating with the cut-away portion 22a of the base 3 to form a cut-away 22 for preventing erroneous insertion other than insertion in the normal insertion posture of the TF card 300. A recess 23b into which a finger is to enter when inserting or extracting the TF card 300 is formed in a substantially middle portion of the front edge. In one side edge of the cover 2 in which the cut-away portion 22b is formed, a cut-away portion 25b for cooperating with the locking cut-away portion 25a of the base 3 to form a locking cut-away 25 is disposed in a portion corresponding to the cut-away portion 25a in continuous with the cut-away portion 22b. In the side edge opposite to the side where the cut-away portion 22b is formed, a recess 26b for cooperating with the recess 26a to form a recess 26 from which the knob 9 is exposed is disposed.

In the lower face (the face opposed to the base 3) of the cover 2 opposed to the base 3 and in a portion corresponding to the eight through holes 29a of the base 3, a contact pressing portion 29b in which a projecting face butts against the upper faces of the ridges 30, and which integrally covers the eight through holes 29a is downward projected. A housing recess 38 into which a linking portion 41 for specific contacts 6c, 6f which will be described later is to be fitted is formed in the projecting face of the contact pressing portion 29b. In the lower face of the cover 2 opposed to the base 3 and in a portion corresponding to a middle portion of the front side edge of the contact housing space 10a of the base 3 in which the upper face is opened, a projection 39b for cooperating with the contact pressing portion 29b to sandwich the insulator 5 of the contact group 7 in the longitudinal direction downward protrude.

In the lower face of the cover 2 opposed to the base 3 and in portions corresponding to the plural projections 35a on the side of the base 3, a plurality of fitting recesses 35b into which the projections 35a are to be fitted, and which are used for fixing with the base 3 are formed. In the outer peripheral edge of the cover 2, a plurality of cut-aways 36b to which the edge portions 36a on the side of the base 3 are to be fitted are formed in portions corresponding to the edge portions 36a.

In the lower face of the cover 2 opposed to the base 3 and in portions corresponding to the plural fitting portions 37a on the side of the base 3, a plurality of fitting portions 37b which are to be fitted to the fitting portions 37a to serve also as positioning ribs and guides in assembling are formed. In the embodiment, plate-like projection pieces 37b which are downward projected from corresponding portions of the cover 2, and which have a rectangular section shape are to be fitted to the rectangular fitting portions 37a on the side of the base 3, rod-like projections 37b which are downward projected from corresponding portions of the cover 2, and which have a circular section shape are to be fitted to inner holes of the cylindrical fitting portions 37a on the side of the base 3, and a projection 37b which is downward projected from a corresponding portion of the cover 2, and which has a substantially triangular shape is to be fitted to an inner hole of the substantially triangular fitting portion 37a on the side of the base 3.

The locking spring 8 is formed by a plate spring made of a thin metal plate, and incorporated into the locking-spring housing space 33a of the base 3 in which the upper face is opened, with being directed in the longitudinal direction and in a vertical posture in which the surface is directed in the lateral direction. A rear end portion of the spring 8 is press-inserted and fixed to a narrow-width rear end portion of the locking-spring housing space 33a in which the upper face is opened. The spring 8 is cantilever-supported in the locking-spring housing space 33a of the base 3 in which the upper face is opened, in a state here the spring is always pressingly contacted with the internal partition wall 14 for the card insertion slot portion 12a in which the upper face is opened. In the spring 8, an engagement portion 8*a* for the locking cut-away 302 of the TF card 300 is disposed in the front portion corresponding to the communication hole 34 of the internal partition wall 14. The spring can be introduced into and extracted from one side portion of the card insertion slot portion 12*a* in which the upper face is opened, via the communication hole 34 by lateral elastic displacement of the spring 8. Alternatively, the locking spring 8 may be a resin-made plate spring which is integrally formed in a process of molding the base 3.

The write-protect knob 9 is formed by a synthetic resin molded product, and configured by an operating portion 9*a* which has a substantially rectangular parallelepiped shape, and an engagement piece 9*b* which protrudes from a lower portion of one side face of the operating portion 9*a*, and which has an L-like section shape. The knob 9 is incorporated into the recess 26*a* in a state where a tip end downward piece portion of the engagement piece 9*b* is inserted from the upper side into the groove 27 of the recess 26*a* of the base 3. The operating portion 9*a* is exposed in the recess 26*a*. The knob 9 can be moved in the longitudinal direction by slidingly moving the tip end downward piece portion of the engagement piece 9*b* in the groove 27, and held to a front or rear end switch position in the recess 26*a* by engaging an engagement projection (not shown) of the groove 27 with either of two engagement portions 9*c* which are projected along the longitudinal edge of an outer side face of the tip end downward piece portion of the engagement piece 9*b*. Therefore, setting of the write protect state is switched depending on the position of the knob 9.

Figure 6:
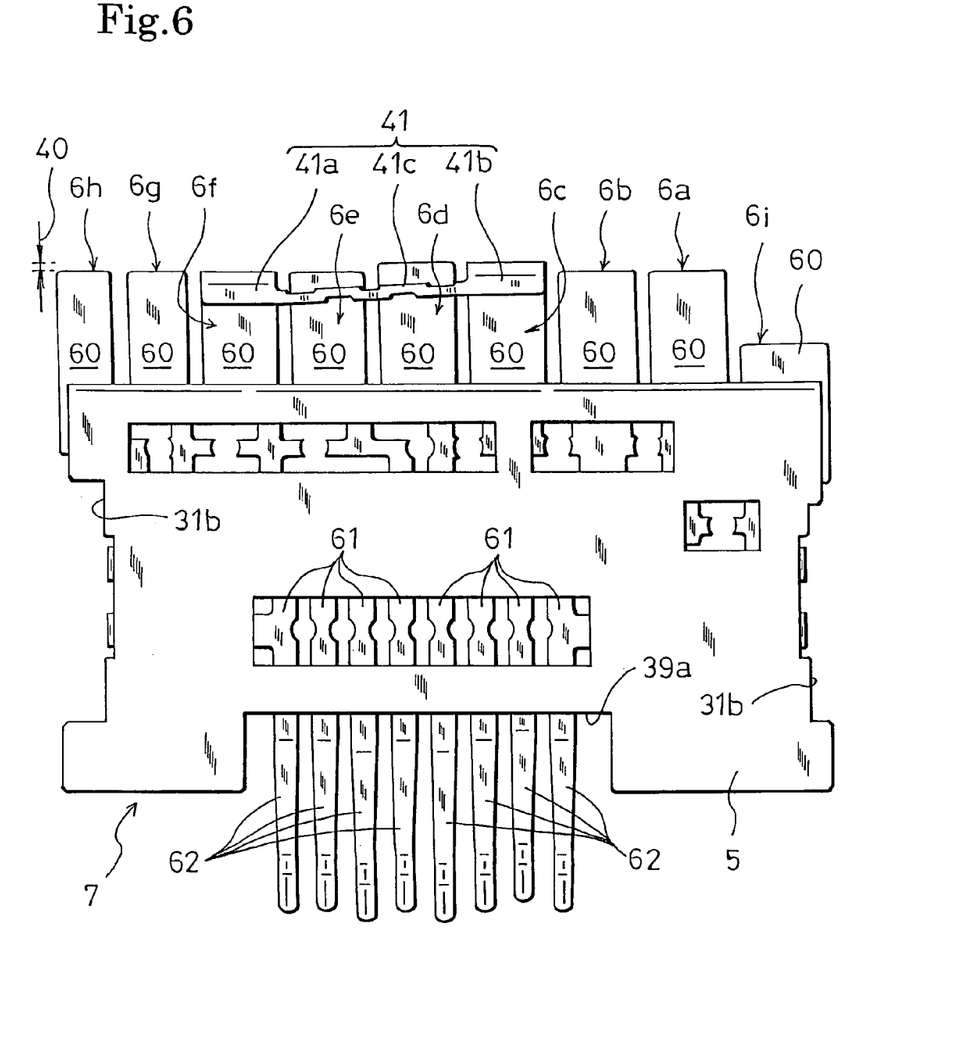
FIG. 6 is an external perspective view of a state after contacts of the adaptor are integrated.
Figure 7:
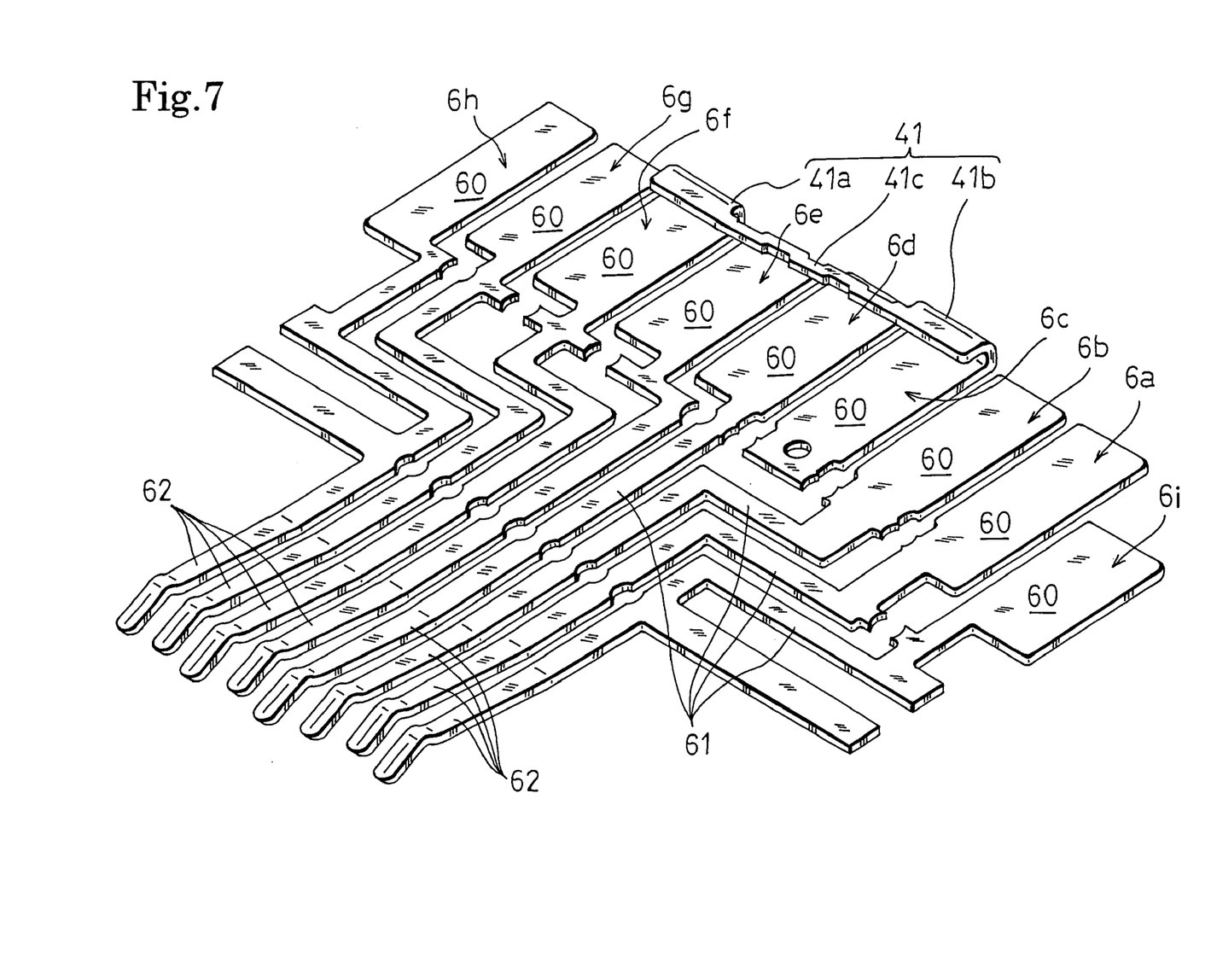
FIG. 7 is an external perspective view of a state before the contacts of the adaptor are integrated.

As shown also in FIGS. 6 and 7, the contact group 7 is formed in state where nine contacts 6*a* to 6*i* which are made of a thin conductive metal plate by insert molding are arranged in the lateral direction and integrated by the rectangular flat plate-like insulator 5 made of an insulating material (synthetic resin). In the nine contacts 6*a* to 6*i*, as seen from the surface side, the contact 6*i* of the 9th pin is placed in the right end, and the contacts 6*a* to 6*h* of the 1st to 8th pins are sequentially placed on the left side of the contact 6*i* which is the 9th pin. Namely, the contacts 6*a* to 6*i* are arranged in the same manner as the nine connect terminals 101*a* to 101*i* of the SD card 100. The two contacts 6*c*, 6*f* which are the 3rd and 6th pins (the fourth and seventh pins from the left side as seen from the surface side) are to be connected to the two ground contacts of the card connector so as to be grounded, in the same manner as the connect terminals 101*c*, 101*f* which are the 3rd and 6th pins of the SD card 100.

Each of the eight contacts 6*a* to 6*i* of the 1st to 9th pins excluding the contact 6*c* of the 3rd pin is configured by continuously integrally forming: a rectangular contact piece 60; a narrow-width middle piece 61 which is continuously integrated with the front end of the contact piece 60; and a contact spring piece 62 which is forward projected from the middle piece 61. The shape of each spring piece 62 in a side view is formed into an L-like shape in which the whole is forward sloping and a portion in rear of the front end is more projected toward the upper side (the side of the cover 2) than the front end.

The contact 6*c* of the 3rd pin which is one of the ground contacts is configured only by a rectangular contact piece 60 that is integrally coupled to a contact piece 60 of the contact 6*f* of the 6th pin which is the other ground contact. The rear end of the contact piece 60 of the contact 6*c* of the 3rd pin which is the one ground contact, and that of the contact piece 60 of the contact 6*d* of the 4th pin which is in neighbor on the left, and which is used for power supply are projected more rearward than rear end portions of the contact pieces 60 of the seven contacts 6*a* to 6*i* of the 1st to 9th pins which are used for power supply, the other ground contact, clock, data, and the like, so that the two contacts 6*c*, 6*d* of the 3rd and 4th pins are made conductive with the contacts of the card connector, in advance of the other seven contacts 6*a* to 6*i*. This is the same as the SD card 100. Therefore, the rear ends (tip ends) of the contact pieces 60 of the two or third and sixth contacts 6*c*, 6*f* which are integrally coupled to each other, which are used for grounding, and which are not adjacent to each other are positionally shifted from each other in the length (longitudinal) direction, so that a step difference (the difference of the projection lengths) 40 is formed between the rear ends.

A linking portion 41 is disposed to directly couple two specific ones of the nine contacts 6*a* to 6*i*, i.e., the ground contacts 6*c*, 6*f* of the 3rd and 6th pins which are plural specific conductive members the tip ends of which are positionally shifted from each other in the longitudinal direction, and which are not adjacent to each other. As a result, the two specific contacts 6*c*, 6*f* which are ground contacts of the 3rd and 6th pins are mechanically and electrically connected to each other in a direct manner.

The linking portion 41 are formed in a process of punching out the set of nine contacts 6*a* to 6*i* from a flat plate-like thin conductive metal plate, between the two specific contacts 6*c*, 6*f* of the 3rd and 6th pins which are ground contacts, and simultaneously and flushly with the contacts. The linking portion is formed into a U-like shape in which the shape in a plan view is forward opened, by: right and left leg portions 41*a*, 41*b* which are bending margins formed by rearward extending the contact pieces 60 of the two specific contacts 6*c*, 6*f* of the 3rd and 6th pins in the same width; and a linkage part 41*c* which bridges in a beam-like manner between the tip ends of the leg portions 41*a*, 41*b*. The linking portion links continuously and integrally the rear ends of the contact pieces 60 of the two specific contacts 6*c*, 6*f* of the 3rd and 6th pins, the step difference 40 being formed between the rear ends, so as to detour around rear portions of the other two contact pieces 60 existing between the contact pieces. The linkage part 41*c* is provided in the front and rear edges with concavity and convexity, so as to be formed as a whole into a corrugated shape which undulates in the card insertion/extraction directions (longitudinal direction). In the process of bending the set of nine contacts 6*a* to 6*i* after punching out the contacts from a flat plate-like thin conductive metal plate, the linking portion 41 undergoes a process of bending the right and left leg portions 41*a*, 41*b* in the length direction into "U-like shape", to be formed into a final shape. The linking portion 41 in the final shape is formed by: the leg portions (bent portions) 41*a*, 41*b* of "U-like shape" in a side view which are formed on rear end portions of the contact pieces 60 of the two specific contacts 6*c*, 6*f* of the 3rd and 6th pins; and the linkage part 41*c* which extends in parallel to and above the rear end portions of the contact pieces 60 of the two specific contacts 6*c*, 6*f* of the 3rd and 6th pins, and which bridges in a beam-like manner between the tip ends of the leg portions 41*a*, 41*b*. The linkage part 41*c* easily flexes in the longitudinal direction because of the external shape, i.e., the corrugated shape (weakened portions) provided to the part. Strain which is caused by the bending process in the step difference 40 between the contact pieces 60 of the two specific contacts 6*c*, 6*f* of the 3rd and 6th pins is absorbed by flexure of the linkage part 41*c*. Therefore, the linkage part 41*c* bridges in a beam-like manner between the tip ends of the leg portions 41*a*, 41*b* in a state where the part is slightly inclined in the longitudinal direction.

In the case where the specific contacts (the two contacts 6*c*, 6*f* of the 3rd and 6th pins which are ground contacts) in the memory card adaptor 1, which are not adjacent to each other, and which are provided with the step difference (the difference of the projection lengths) 40 are directly coupled to each other, the tip end portions of the specific contacts 6c, 6f are bent into "U-like shape", the tip end portions are linked, and the linkage part 41c is corrugated, whereby strain which is caused by the bending process in the step difference (the difference of the projection lengths) 40 between the tip end portions of the specific contacts 6c, 6f of the 3rd and 6th pins can be absorbed by the linkage part 41c. In the case where the step difference (the difference of the projection lengths) is not formed in the tip end portions of the specific contacts, even when the tip end portions of the specific contacts are simply bent into "L-like shape", and are linked by a straight shape, there arises no problem. By contrast, in the case of the specific contacts 6c, 6f in which the step difference (the difference of the projection lengths) is formed in the tip end portions, strain which is caused by the bending process in the step difference (the difference of the projection lengths) 40 between the tip end portions of the specific contacts 6c, 6f of the 3rd and 6th pins cannot be absorbed by the linkage part, and hence the specific contacts 6c, 6f are attracted to each other by the strain which is caused by the bending process, thereby causing positional displacement. When the tip end portions of the specific contacts 6c, 6f are bent into "U-like shape", the corrugated shape of the linkage part 41c can be configured not in the card thickness direction (vertical direction), but in the card insertion direction (longitudinal direction). Therefore, various corrugated shapes can be set without substantially receiving dimensional restrictions in the card thickness direction, and an optimum corrugated shape can be easily obtained.

The thus configured nine contacts 6a to 6i constitute the contact group 7 configured by one set of nine contacts in which front portions of the contact pieces 60 of all the nine contacts 6a to 6i of the 1st to 9th pins, and the middle pieces 61 of the eight contacts 6a to 6i of the 1st to 9th pins excluding the contact 6c of the 3rd pin are embedded in the rectangular flat plate-like insulator 5, the contact pieces 60 of all the nine contacts 6a to 6i of the first to ninth pins are rearward projected in a laterally arranged state from the whole width of the rear side face of the rectangular flat plate-like insulator 5, and the contact spring pieces 62 of the eight contacts 6a to 6i of the 1st to 9th pins excluding the contact 6c of the 3rd pin are forward projected in a laterally arranged state from the middle portion of the front side face of the rectangular flat plate-like insulator 5. The contact group 7 is incorporated into the contact housing space 10a of the base 3 in which the upper face is opened, in the state where the eight contact spring pieces 62, which are forward projected in a laterally arranged state from the middle portion of the front side face of the insulator 5, are projected into the rear portion of the card insertion slot portion 12a of the base 3 in which the upper face is opened. The nine contact pieces 60 which are rearward projected in a laterally arranged state from the whole width of the rear side face of the insulator 5 are opposed respectively to the eight through holes 29a of the base 3, the holes corresponding to nine through holes.

Engagement recesses 31b to which the right and left engagement portions 31a of the base 3 are to be fitted are disposed in portions which are in right and left side areas of the rectangular flat plate-like insulator 5, and which correspond to the right and left engagement portions 31a of the base 3. An engagement recess 39a to which the projection 39b of the cover 2 is fitted is disposed in a portion which is in the front side edge of the rectangular flat plate-like insulator 5, and which corresponds to the projection 39b of the cover. Fixing portions which are similar to the projections 35a and fitting recesses 35b for fixing the base 3 with the cover 2 may be disposed between the insulator 5 of the contact group 7, and the base 3 and the cover 2.

The memory card adaptor 1 of the embodiment is assembled in the following manner. The contact group 7 is incorporated as described above into the contact housing space 10a of the base 3 in which the upper face is opened, the locking spring 8 is incorporated as described above into the spring housing space 33a of the base 3 in which the upper face is opened, and the knob 9 for write protect is incorporated into the recess 26a of the base 3. Thereafter, the cover 2 is fitted to the base 3 from the upper side to cover the base, thereby completing the assembling process. In the assembly completion state, the upper face of the insulator 5 in the contact group 7 butts against the lower face of the cover 2, and the insulator is pressingly held between the cover and the bottom plate 17 of the base 3. The linking portion 41 which electrically and mechanically connects in a direct manner the two specific contacts 6c, 6f of the 3rd and 6th pins for grounding are fitted into the housing recess 38 of the cover 2. The lower face of the contact pressing portion 29b butts against the upper faces of the nine contact pieces 60, and the nine contact pieces 60 are pressingly held between the contact pressing portion and the bottom plate 17 of the base 3. The lower faces of the contact pieces are exposed from the rear face through the respective through holes 29a of the base 3. The eight contact spring pieces 62 are placed in the laterally arranged state in the rear area (inner area) of the card insertion slot portion 12. The cover 2 and the base 3 are joined together by a method such as welding by means of heat, an ultrasonic wave, or the like, or adhesion.

In the embodiment, when the memory card adaptor 1 is to be assembled, the plural fitting portions 37a, 37b disposed on the cover 2 and the base 3, namely the upper and lower cases, are mutually fitted, so that the cover 2 and the base 3 are provisionally fixed by the fitting portions 37a, 37b. Therefore, a jig dedicated to positioning of the cover 2 and the base 3 is not necessary. Moreover, the worker is required to have little skill, and hence anyone can easily assemble the adaptor. When the cover 2 and the base 3 are to be welded together by means of heat, an ultrasonic wave, or the like, positional deviation due to the welding between the cover 2 and the base 3 does not occur because the cover 2 and the base 3 are positioned by the plural fitting portions 37a, 37b. Therefore, the cost for assembling of the memory card adaptor 1 can be reduced, and the workability is very high.

Furthermore, the plural fitting portions 37a, 37b are disposed in the periphery of the card insertion port 11 and the card insertion slot portion 12. While the card insertion port 11 and the card insertion slot portion 12 are formed with being split in two parts by the cover 2 and the base 3, therefore, the card insertion port 11 and the card insertion slot portion 12 are reinforced by the plural fitting portions 37a, 37b, and the shapes and dimensions of the card insertion port 11 and the card insertion slot portion 12 can be maintained accurately and stably. In the case where a closed (rectangular) card insertion port is formed in the base 3, for example, molds for the base 3 must be provided with a slide, and hence the molds are expensive. By contrast, in the embodiment, it is not necessary to provide molds with a slide, and hence the molds can be produced economically.

In the memory card adaptor 1 of the embodiment, the two specific contacts 6c, 6f of the 3rd and 6th pins for grounding are mechanically and electrically connected (coupled) to each other in a direct manner by the linking portion 41. Unlike the conventional art, therefore, it is not required to partly dispose a metal portion in the resin-made cover 2, and connect the specific contacts of the 3rd and 6th pins for grounding through the metal portion. Consequently, the number of parts in the memory card adaptor 1 can be reduced as compared with the conventional art, and the production cost can be further reduced.

The TF card 300 is attached to the thus assembled memory card adaptor 1 in the following manner. The TF card 300 is inserted into the card insertion slot portion 12 through the card insertion port 11 in the normal insertion posture in which the longitudinal and front/back directions of the TF card 300 are oriented to the normal directions. Then, the TF card 300 is inserted to an inner area of the card insertion slot portion 12 while the side portion where the locking cut-away 302 is disposed pushes back the engagement portion 8a of the locking spring 8 with producing elastic displacement of the spring 8. The eight connect terminals 303a to 303h which are disposed on the rear face of the rear end portion of the TF card 300 are in contact with the eight contact spring pieces 62 placed in the rear portion of the card insertion slot portion 12 to be electrically connected thereto. When the TF card 300 is further inserted into the card insertion slot portion 12, the rear end portion of the TF card 300 bumps against the front side face of the insulator 5 of the contact group 7 which rises in the rear end of the card insertion slot portion 12, thereby restricting further insertion. The engagement portion 8a of the locking spring 8 is opposed to the locking cut-away 302 of the TF card 300, and the spring 8 is elastically restored to cause the engagement portion 8a to be engaged with the locking cut-away 302, thereby preventing the TF card 300 from dropping off.

When the TF card 300 attached to the memory card adaptor 1 is to be extracted, the front end portion of the TF card 300 exposed from the recesses 23a, 23b is nipped, and the TF card 300 is forward extracted against the spring force of the locking spring 8. Then, the engagement state between the locking cut-away 302 and the engagement portion 8a of the locking spring 8 is canceled, and the TF card 300 can be easily extracted from the memory card adaptor 1.

In the TF card 300 attached to the memory card adaptor 1, the eight connect terminals 303a to 303h are electrically connected to the nine contacts 6a to 6i. When the memory card adaptor 1 is attached to a card connector (not shown) for the SD card 100, therefore, the eight connect terminals 303a to 303h of the TF card 300 are electrically connected to nine contacts of the card connector through the nine contacts 6a to 6i. As a result, the memory card adaptor 1 enables the TF card 300 to be handled in the same manner as the SD card 100. Consequently, the TF card 300 can be used also as a removable external memory.

In the embodiment, the memory card adaptor 1 for the TF card 300 has been described. Alternatively, when a card insertion port, a card insertion slot portion, a contact group, and the like for the mini SD card shown in FIG. 9 are formed, it is possible to configure a memory card adaptor for the mini SD card 200. Also in the memory card adaptor for the mini SD card 200, the direct coupling structure between the two specific contacts 6c, 6f of the 3rd and 6th pins for grounding in the embodiment is effective.

What is claimed is:

1. A memory card adaptor to which a small memory card is to be attached, and which is to electrically and mechanically connect said small memory card to a card connector for a large memory card which is larger in external shape than said small memory card, wherein said memory card adaptor comprises: an adaptor body into and from which said small memory card is to be inserted and extracted through a card insertion port that is opened in a side face, and which is to be inserted into and extracted from said card connector for said large memory card; and plural conductive members which are arranged in said adaptor body, which are to be electrically connected to plural connect terminals of said small memory card that is inserted through said card insertion port, and which, when attached to said card connector, are to be electrically connected to plural contacts of said card connector, a linking portion which directly couples plural specific ones of said plural conductive members is disposed, said specific conductive members being not adjacent to each other, tip ends of said specific conductive members being positionally shifted from each other in a length direction, and a linkage part of said linking portion is between bent portions which are formed by bending tip end portions of said specific conductive members into "U-like shape" along the length direction, and is formed into a corrugated shape which undulates in card insertion/extraction directions.

2. A memory card adaptor according to claim 1, wherein said adaptor body is configured by upper and lower cases which are fitted to each other, and said upper and lower cases are provided respectively with positioning ribs which are fitted to each other.

3. A memory card adaptor according to claim 1, wherein said adaptor body is configured by upper and lower cases which are fitted to each other, a card insertion slot portion for said small memory card is formed by fitting of said upper and lower cases, and said upper and lower cases are provided respectively with fitting portions which are in a periphery of said card insertion slot portion, and which are fitted to each other.

4. A memory card adaptor according to claim 1, wherein said small memory card is a TransFlash card, said large memory card is an SD card, and said specific conductive members are two conductive members which are to be connected to ground contacts of said card connector.

* * * * *